United States Patent [19]

Motamedi

[11] Patent Number: 4,943,974
[45] Date of Patent: Jul. 24, 1990

[54] DETECTION OF BURST SIGNAL TRANSMISSIONS

[75] Inventor: Masoud Motamedi, Gaithersburg, Md.

[73] Assignee: Geostar Corporation, Washington, D.C.

[21] Appl. No.: 260,614

[22] Filed: Oct. 21, 1988

[51] Int. Cl.⁵ ............................................. H04K 1/00
[52] U.S. Cl. ....................................................... 375/1
[58] Field of Search ...................... 375/1, 96, 102, 115

[56] References Cited

U.S. PATENT DOCUMENTS

| | | | |
|---|---|---|---|
| 4,312,074 | 1/1982 | Pautler et al. | 375/96 |
| 4,361,896 | 11/1982 | Garner | 375/96 |
| 4,400,790 | 8/1983 | Chambers et al. | 375/1 |
| 4,418,393 | 11/1983 | Zscheile, Jr. | 375/1 |
| 4,455,665 | 6/1984 | Kromer, III | 375/96 |
| 4,475,215 | 10/1984 | Gutleber | 375/102 |
| 4,530,103 | 7/1985 | Mosley, Jr. et al. | 375/1 |
| 4,538,281 | 8/1985 | Rajan | 375/1 |
| 4,561,089 | 12/1985 | Rouse et al. | 375/1 |
| 4,567,588 | 1/1986 | Jerrim | 375/1 |
| 4,639,932 | 1/1987 | Schiff | 375/1 |
| 4,644,523 | 1/1987 | Horwitz | 375/1 |
| 4,653,076 | 3/1987 | Jerrim et al. | 375/115 |
| 4,740,792 | 4/1988 | Sagey et al. | 342/457 |

OTHER PUBLICATIONS

Robert C. Dixon, *Spread Spectrum Systems*, second edition, pp. 234–248 (New York: John Wiley and Sons, 1984).

M. K. Simon et al., *Spread Spectrum Communications*, Vol. III, pp. 67–74, 233–234 (Rockville, Md.: Computer Science Press, 1985).

*Primary Examiner*—Salvatore Congialosi
*Attorney, Agent, or Firm*—Venable, Baetjer and Howard

[57] ABSTRACT

A method is disclosed for detecting the presence of and synchronizing to burst transmissions which contain repeated acquisition codes. The received signal is applied as an input to a surface acoustic wave (SAW) filter which is matched to detect one repetition of the code. The SAW filter correlation output is sampled at times corresponding to the times of arrival of each repetition of the code. The mean value and variance of the correlation values for each repetition are computed, and the system declares an acquisition when the mean value and variance meet certain criteria.

68 Claims, 8 Drawing Sheets

CORRELATION
PULSE

CORRELATION
PULSE
ENVELOPE

GATE
PULSE

DIFFERENTIATED
ENVELOPE

DETECT
OUTPUT

DETECTION OF BURST SIGNAL TRANSMISSIONS

BACKGROUND OF THE INVENTION:

The invention as hereinafter described relates generally to the field of communications, and is specifically concerned with a method for acquiring burst signal transmissions, particularly spread spectrum transmissions, which contain repeated acquisition codes.

The phrase "spread spectrum" generally refers to methods of radio transmission in which the frequency bandwidth of the transmission greatly exceeds the minimum necessary to communicate the desired information. Numerous types of spread spectrum techniques exist. So-called "direct sequence" systems are those in which the carrier is modulated by a digital code sequence whose bit or "chip" rate is much higher than the information bit rate. "Frequency hopping" systems are those in which the carrier frequency is switched among a plurality of predetermined values. "Chirp modulation" systems sweep the carrier over a wide band during a given pulse interval. These techniques are described in some detail by R.C. Dixon in *Spread Spectrum Systems* (New York: Wiley and Sons, 1984).

By spreading information over a wide bandwidth relative to the minimum necessary data bandwidth, information may be communicated at relatively low signal-to-noise ratios. This allows signals to be concealed in background noise and provides protection against hostile jamming and unintentional interference.

In some types of direct sequence spread spectrum communication systems, such as radio position determination and message exchange systems, multiple users share the bandwidth simultaneously and the transmissions from any one user occur asynchronously in short bursts, separated by periods of inactivity. The beginning of a burst contains a portion referred to as an acquisition sequence, which is designed to allow a receiver to acquire (i.e., detect the presence of and synchronize to) a burst. Such a portion may be a signal having a high autocorrelation. The remainder of the burst contains the information intended for transmission.

In frequency hopping systems, while one user transmits a burst on one frequency, another user can transmit a burst on a different frequency. In direct sequence systems using pseudo-noise codes, other users appear as background noise. In direct sequence systems, moreover, the amplitude of the signal energy in the communication channel may be less than the amplitude of the noise energy in the channel. That is, signal-to-noise ratios may be much less than one. In such systems, the signal energy is spread over time, and receivers must detect and distinguish signal energy from noise energy.

Many direct sequence spread spectrum systems use surface acoustic wave (SAW) devices at the receiving end. SAW devices convert electrical (voltage) signals into surface waves on a piezoelectric crystal. Because the surface waves of the crystal propagate more slowly than electromagnetic waves, SAW devices may be used to delay a signal in time. SAW devices may be used as code matched filters, that is, filters which are designed to detect a particular code sequence in a signal. Metallic strips which detect the presence of the surface waves may be attached at selected positions on the crystal surface. Such strips can be placed so that they detect the pattern of surface waves which are produced when a signal containing a particular code sequence propagates across the crystal. Matched SAW filters have an output, referred to as a correlation output, which produces an analog signal having a magnitude proportional to the degree of similarity between the input sequence and the sequence for which the filter was designed. When the value of the correlation utput exceeds a threshold value, the system declares an acquisition and other circuitry is employed to demodulate, de-spread and perform further signal processing functions on the received signal.

Technical limits exist on the length of the sequence for which a matched SAW filter may be designed. The maximum sequence length depends in part on the chip rate of the sequence (which determines the time period over which the sequence is transmitted), the propagation speed of the surface wave on the crystal, and the size of the crystal. On the other hand, design limitations on the communication system determine the minimum sequence length which theoretically ensures reliable detection of the burst transmission by the receiver.

Matched SAW filters are designed to detect patterns in signals having a particular center frequency, and the sensitivity of the matched SAW filter decreases for signals whose center frequency is different from the design frequency. That is to say, the magnitude of the correlation output diminishes as the center frequency deviates from the frequency for which the SAW filter was designed. For a given frequency shift, SAW filters designed for long code sequences have a greater loss in sensitivity than SAW filters designed for short code sequences. Toleration of frequency shifts is especially necessary in systems where a receiver must detect the presence of signals from many user terminals which may transmit at frequencies that are slightly shifted from one another (e.g., by virtue of differences among their oscillators, or because a given oscillator may drift over time).

One proposed method of using a matched SAW filter to detect the presence of a long acquisition sequence is to utilize an acquisition sequence which is made up of several short sequences, each having a length for which a single SAW filter can be designed. When a long acquisition sequence made up of repetitions of the short sequence is input to the SAW filter, the SAW filter will produce a series of pulses at the correlation output, one pulse for each repetition of the short sequence. However, the individual pulses may be obscured by noise, because each short sequence is too brief to allow reliable detection in a system which was designed for a long acquisition sequence. Accordingly, the detection pulses from the SAW filter correlation output must be further processed in order to reliably detect the presence of a transmission.

One method that has been used for processing individual detection pulses is to compare each pulse to a threshold value and perform a majority logic operation on the results. That is, if a majority of the received pulses exceed the threshold, then acquisition is declared. Unfortunately, the use of a majority decision suffers from the drawback that it does not utilize the total amount of information in the detected pulses. For example, a detection pulse which is less than the threshold by a small amount is disregarded, just as a pulse which is far below the threshold. Further, a detection pulse which is significantly above the threshold is given no more weight than one which barely exceeds the threshold.

Another method for processing detection pulses that has been used in radar receivers and in decoding algorithms is to quantify the magnitude of each pulse and sum up all the values, either linearly or quadratically. If the sum exceeds a predetermined threshold, then acquisition is declared. However, the use of a summation has the disadvantage that the threshold must be set at a level which is optimized for a particular absolute signal strength, that is, for the particular signal-to-noise ratio of the communication channel. In applications such as radio position determination systems, where transmitters in surface vehicles or aircraft may range over large portions of the earth, the signal-to-noise ratio will vary for each transmitter due to range and local conditions. It is desirable, therefore, to utilize a detection pulse processing scheme which offers good noise rejection for transmissions having variable signal and noise levels.

SUMMARY OF THE INVENTION

In accordance with the present invention, the presence of a burst signal transmission containing repeated acquisition codes is detected by computing values proportional to both the mean value and variance of the magnitudes of the individual detection pulses produced in response to the acquisition codes, and comparing these computed values with predetermined threshold values in order to determine whether a valid signal acquisition has occurred. This technique makes use of the total energy in the detected pulses, as a result of the summation which is inherent in the mean value computation. In addition, computation of the variance allows pulse groups having large magnitude variations to be discarded, thereby providing excellent noise rejection. The detection method of the present invention allows burst signal transmissions to be detected at much lower signal-to-noise ratios than has heretofore been possible.

In one aspect, therefore, the present invention relates to a method for detecting a burst signal transmission containing a sequence of N acquisition codes occurring at known time intervals. The method comprises the steps of receiving the burst signal transmission and comparing successively received portions thereof to a stored acquisition code pattern; generating a time-varying correlation output having a magnitude proportional to the similarity between the successively received portions of the burst signal transmission and the stored acquisition code pattern; detecting and measuring peaks in the magnitude of the correlation ouptut; forming a group of N peak magnitudes occurring at time intervals corresponding to the known time intervals; computing values proportional to the mean value and variance, respectively, of the group of N peak magnitudes; comparing the computed values proportional to the mean value and variance to predetermined minimum and maximum values, respectively; and indicating the presence of a burst signal transmission when the computed value proportional to the mean value exceeds the minimum value and the computed value proportional to the variance is less than the maximum value.

Additional aspects of the present invention relate to a method for detecting first and second burst signal transmissions which arrive in an overlapping manner, and to an acquisition circuit, receiver and communication system operating in accordance with the methods disclosed and claimed herein. The invention has particular utility in satellite-based position determination systems employing spread spectrum ranging signals, but is also useful in other applications.

BRIEF DESCRIPTION OF THE DRAWINGS

The various objects, advantages, and novel features of the present invention will be more readily apprehended from the following detailed description when read in connection with the appended drawings, in which.

DESCRIPTION OF THE PREFERRED EMBODIMENT: DETAILED

Figure 1:
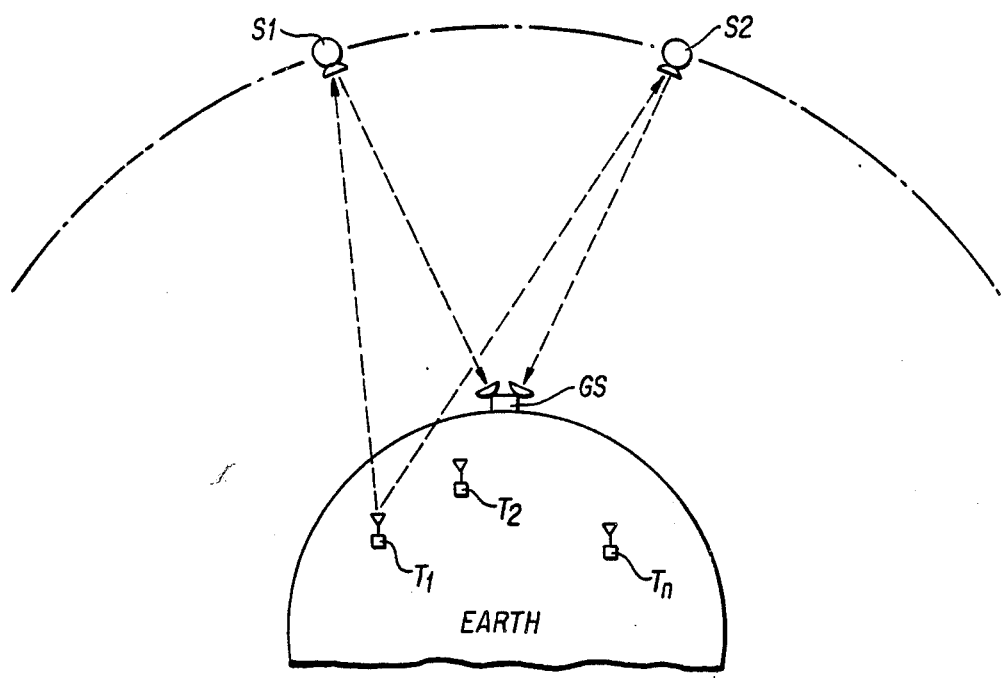
FIG. 1 illustrates an exemplary communication network in which spread spectrum burst transmissions from a plurality of remote user terminals propagate to a ground station through multiple satellite paths.

FIG. 1 is a representation of a radio communication network which includes a plurality of remote user transceivers or terminals T1, T2, ..., Tn and two communications satellites S1, S2 in orbit above the earth. A ground station GS acts as a master terminal for controlling and monitoring the network. The ground station also performs specialized functions related to determining the positions of the user terminals as discussed, for example, in U.S. Pat. No. 4,359,733, issued to G.K. O'Neill on Nov. 16, 1982; in U.S. Pat. No. 4,744,083 issued to G.K. O'Neill and L.O. Snively on May 11, 1988; and in U.S. Pat. No. 4,839,656, issued to G. K. O'Neill and L. O. Snively on June 13, 1989. In such a system, the ground station periodically transmits an interrogation signal which is repeated by one of the satellites to the user terminals. Each user terminal responds to the interrogation signal by transmitting a reply signal back to the ground station. The reply signal contains information identifying the originating user terminal and, optionally, message information intended for another user terminal or for the ground station. The reply signal from each user terminal propagates back to the ground station by means of multiple satellite paths. Computing equipment in the ground station measures the transmission delays through the multiple satellite paths and computes the positions of the user terminals, some or all of which may be mobile. The ground station also relays message information to specified user terminals during the next subsequent interrogation cycle. In alternative embodiments of the system illustrated in FIG. 1, the interrogation signals transmitted by the ground station GS may be omitted and autonomously or randomly operating user terminals may be employed.

Figure 2:
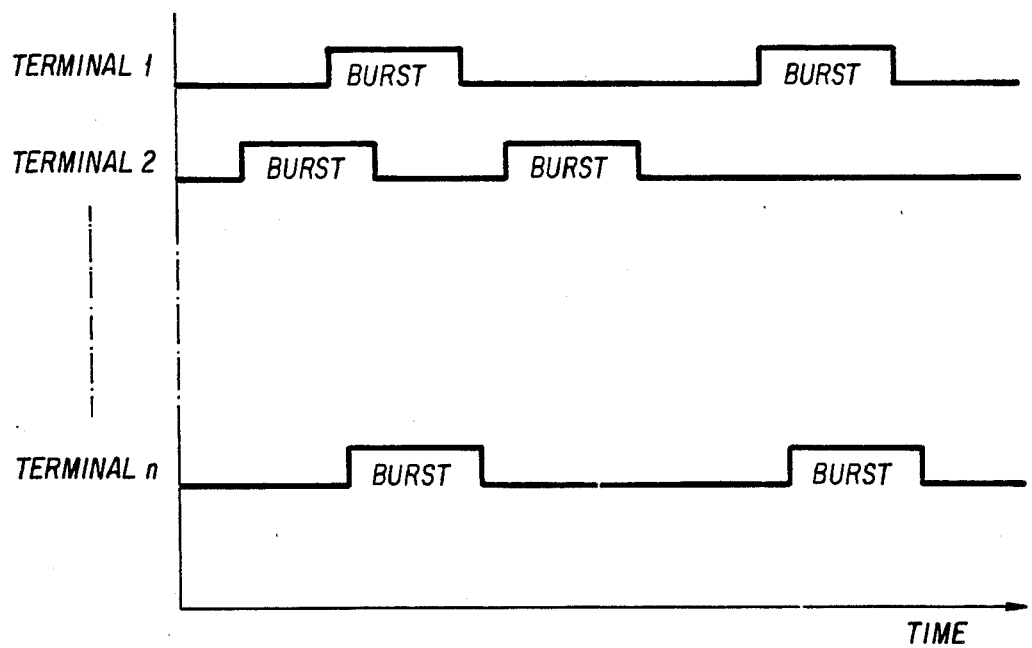
FIG. 2 depicts the relative timing of burst transmissions received from different users at the ground station.

Transmissions from a given user terminal consist of emissions of electromagnetic energy during relatively brief periods of time, referred to as "bursts." The burst transmissions are separated by relatively long intervals of inactivity, the length of these intervals corresponding to the interrogation period at the ground station. FIG. 2 shows the relative timing of bursts from different user terminals as observed at the ground station. The received transmissions are asynchronous; that is, bursts from different terminals experience varying transmission delays and may overlap in time as observed by the ground station.

In a preferred embodiment of the system shown in FIG. 1, bursts are emitted by the user terminals in accordance with a transmission technique known generally as direct sequence spread spectrum modulation. During each burst, digital information to be transmitted is used to modulate a specially selected digital sequence known as a pseudo-noise code, hereinafter referred to as a "PN code". A PN code is a digital sequence which has a high correlation to itself when in phase, but a low correlation to itself which shifted in time. The clocking rate for a PN code is much higher than the data rate of the information to be transmitted. One clock cycle of the PN code is referred to as a "chip." One method for modulating a PN code with the information to be transmitted is to form the exclusive OR of the information signal with the PN code. The resulting signal is then used to modulate a carrier.

The result of modulating a carrier with the PN code (which has itself been modulated with the information to be transmitted) is that the carrier is modulated at a high rate relative to the data rate of the inoormation to be transmitted. The information is thus "spread" over a wide bandwidth.

In the preferred embodiment, the PN code chip rate is eight megahertz (8 MHz), and biphase shift keying is used to modulate an intermediate frequency carrier having a center frequency on the order of seventy megahertz (70 MHz). The intermediate frequency carrier is converted to a frequency in the gigahertz range for transmission to the satellites. It should be noted, however, that the invention is not limited to any particular modulation technique or frequency of transmission.

Figure 3:
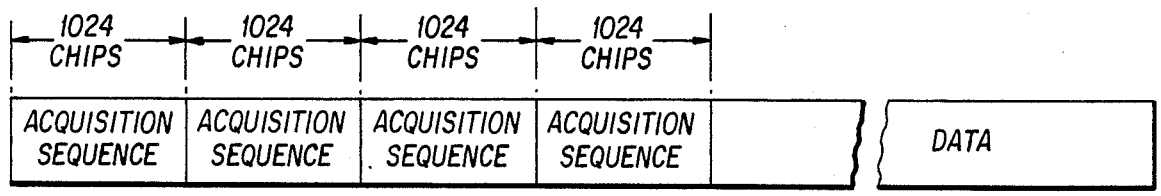
FIG. 3 illustrates an exemplary format of a burst transmission from a remote user terminal.

FIG. 3 shows an exemplary burst transmission from a user terminal as a function of time. The digital information consists of four repetitions of a 1024-chip acquisition sequence followed by identification and message data. The length of the acquisition sequence and the number of repetitions of the sequence are not critical. Moreover, although the successive acquisition sequences are identical in the preferred embodiment of the invention, this is not required. A number of different sequences may be used, and each may be of a different length. The four repetitions may also be separated in time. For example, each sequence may be separated by two (2), four (4), or six (6) chips. Such separations may be useful to allow a receiver time to reset circuitry or take other action between successive acquisition sequences.

Figure 4:
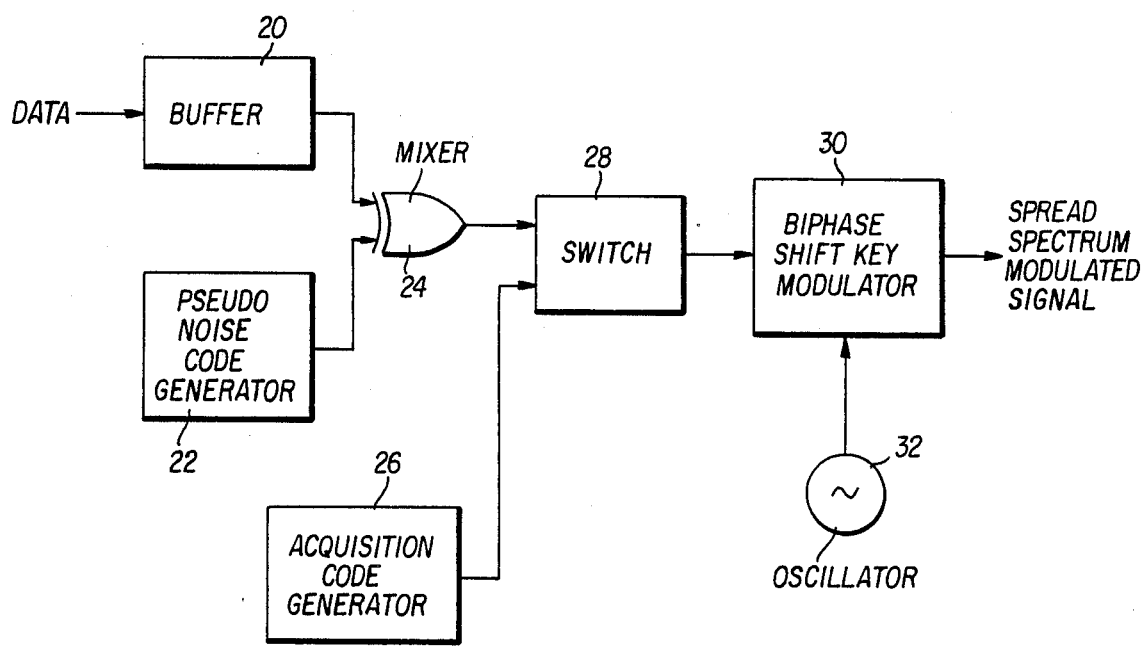
FIG. 4 depicts a block diagram of an exemplary direct sequence spread spectrum modulator for producing the burst transmission of FIG. 3.

FIG. 4 is a block diagram of an exemplary transmitter for producing a spread spectrum modulated signal. The transmitter forms a part of each user terminal T1, T2, . . . , Tn in the network shown in FIG. 1. A buffer 20 stores digital data so that it can be transmitted in bursts at the appropriate times. A pseudo-noise code generator 22 produces a binary sequence having the desired length and correlation properties at a chip rate corresponding to the available bandwidth in the communication channel. A mixer 24, which may consist of circuitry performing an exclusive OR function, modulates the pseudo-noise sequence with the digital data. The bit rate of the data is significantly lower than the chip rate of the pseudo-noise sequence. An acquisition code generator 26 produces an acquisition sequence, and a switch 28 connects either the output from acquisition sequence generator 26 or the mixer 24 to a biphase shift key modulator 30 so as to produce the desired burst format. An oscillator 32 provides a carrier on which the pseudo-noise spread data is modulated. In some applications a separate acquisition sequence generator and switch are not required, because all sections of the acquisition sequence are identical, and a portion of the pseudo-noise code itself can function as the acquisition sequence. For example, the pseudo noise code generator may be started and reset multiple times in order to produce multiple repetitions of the acquisition sequence.

Figure 5:
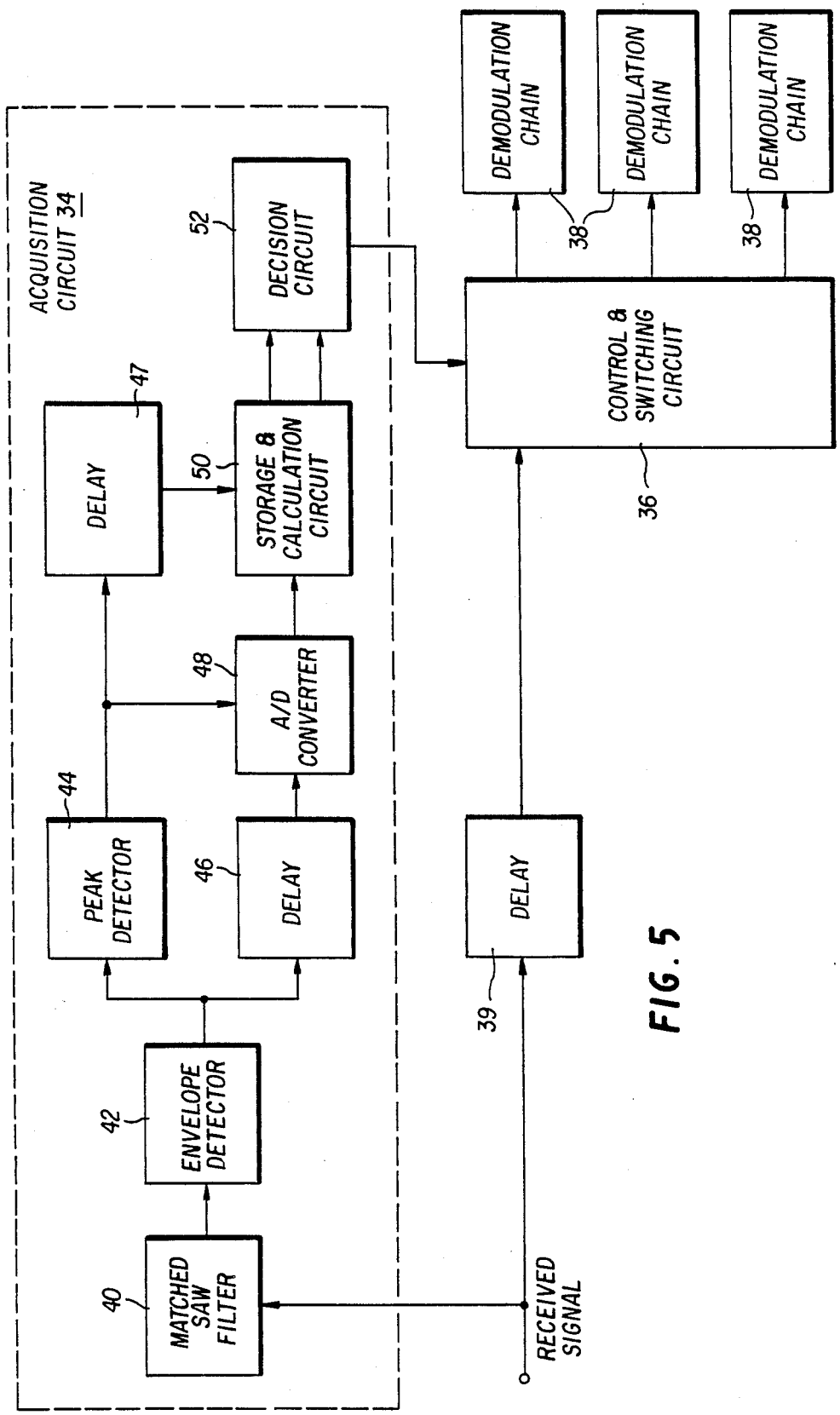
FIG. 5 depicts the organization of functional elements of an exemplary circuit for detecting a burst transmission having the format shown in FIG. 3.

FIG. 5 is a block diagram of a receiver incorporating acquisition circuitry 34 constructed in accordance with the present invention, along with other functional elements. The receiver operates generally in the following manner. Control and switching circuitry 36 connects an incoming signal to one of a plurality of demodulation chains 38 when the acquisition circuit 34 indicates the presence of a transmission. The incoming signal may be a single burst consisting of an acquisition portion and a data portion from any of a plurality of transmitters, or multiple bursts overlapping in time, or noise on an empty transmission channel. The control unit 36 may simultaneously connect the incoming signal to more than one of the demodulation chains 38, as for example when burst transmissions from multiple transmitters overlap in time. A delay line 39 delays the received signal by an amount equal to the delay through the acquisition circuit 34.

The acquisition circuit 34 consists of a matched SAW filter 40, an envelope detector 42, a peak detector 44, delay lines 46 and 47, an analog-to-digital (A/D) converter 48, a storage and calculation circuit 50, and a decision circuit 52. In principle, the four repetitions of the acquisition sequence have lengths and relative separations in time which are known. Four repetitions originating from one transmitter will have approximately equal energy, and the SAW filter 40 will produce four pulses of approximately equal amplitude separated in time by a known interval. Generally speaking, the acquisition circuit 34 declares detection when it detects four correlation pulses of approximately equal amplitude separated by the anticipated time intervals.

The acquisition circuit 34 operates generally in the following manner. The SAW filter 40 receives the incoming signal and produces a correlation pulse having an amplitude proportional to the correlation between the signal and the anticipated acquisition code sequence. The envelope detector 42 removes the carrier from the matched SAW filter correlation output. The peak detector 44 identifies the peak magnitude of the correlation pulse and initiates digitization of the peak value by the A/D converter 48. The storage and calculation circuit 50 computes the mean value and the variance of successive samples of the correlation output which are separated in time by the appropriate time intervals. The decision circuit 52 produces an acquisition signal for the control circuitry 36 when the mean value exceeds a preset threshold value and the variance is less than a preset threshold value.

Figure 6:
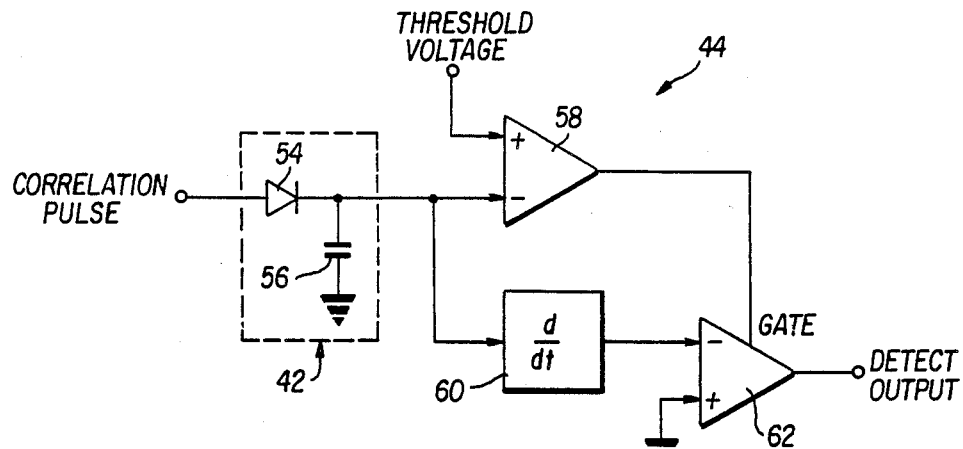
FIG. 6 illustrates the components of the envelope detector and peak detector used in the circuit of FIG. 5.

FIG. 6 is a block diagram of the envelope detector 42 and peak detector 44. The envelope detector may consist of a diode 54 and capacitor 56. The peak detector 44 includes a threshold comparator 58, a differentiation circuit 60, and a gated comparator 62. The operation of the peak detector 44 is best understood by following a correlation pulse through the circuitry, as illustrated in FIGS. 7a-7e.

Figure 7A:
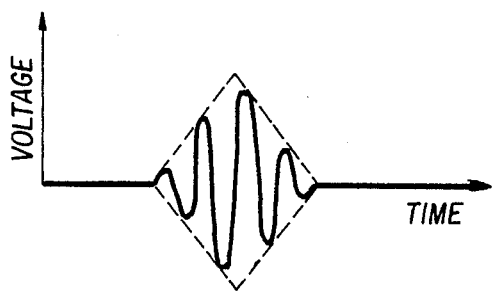
FIGS. 7a–7e are graphs depicting waveforms which occur at various points in the circuit of FIG. 5 when an acquisition code sequence is detected.

FIG. 7a shows the correlation pulse at the correlation output of the SAW filter 40. The correlation output of the matched SAW filter 40 is an analog voltage signal which is a sinusoid (at the carrier frequency) and whose envelope amplitude is proportional to the correlation between the input sequence and the sequence for which the filter was designed.

Figure 7B:
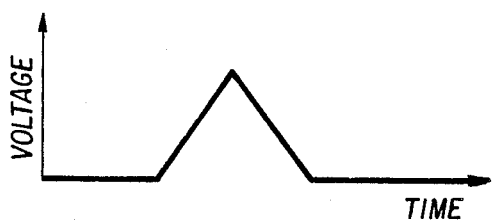

FIG. 7b shows the output of the envelope detector. The carrier oscillations have been filtered, and the negative portion of the correlation pulse has been eliminated.

Figure 7C:
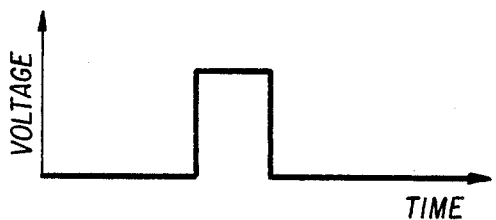

FIG. 7c shows the output of the threshold comparator 58, which serves as a gate input for the gated comparator 62. The gate input is positive and enables the comparator 62 as long as the envelope exceeds a preset threshold value. As a result, the gated comparator is enabled only when the correlation output exceeds a certain noise floor.

Figure 7D:
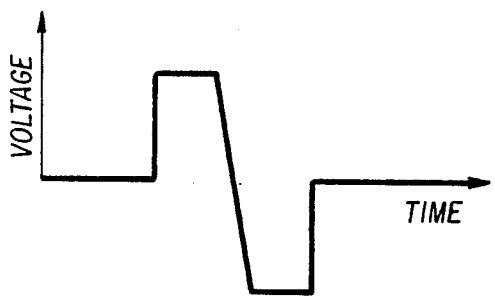

FIG. 7d shows the output of the differentiation circuit 60 during a correlation pulse. The output of the differentiation circuit 60 crosses zero and becomes negative at the moment when the slope of the envelope becomes zero, that is, at the moment when the correlation pulse reaches its maximum value.

Figure 7E:
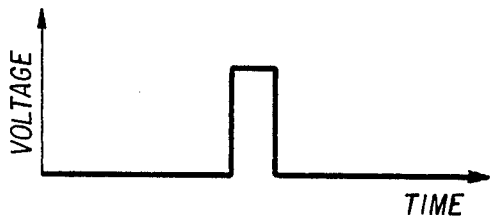

FIG. 7e shows the detect output from the gated comparator 62. The detect output is a pulse whose rising edge occurs at the peak of the correlation pulse, and whose falling edge occurs when the correlation pulse envelope falls below the preset threshold.

Referring again to FIG. 5, the detect output from the peak detector 44 causes the A/D converter 48 to digitize the peak magnitude of the correlation pulse envelope. A delay line 46 between the envelope detector 42 and the A/D converter 48 delays the correlation pulse envelope by a time equal to the propagation delay of the peak detector 44.

It should be emphasized that the incoming signal itself serves as the trigger for the analog-to-digital conversion process. Triggering the A/D converter 48 with the peak of the correlation output allows for a more accurate measurement of the correlation output than by triggering the A/D conversion with a clock signal which is not derived from the correlation output.

Figure 8:
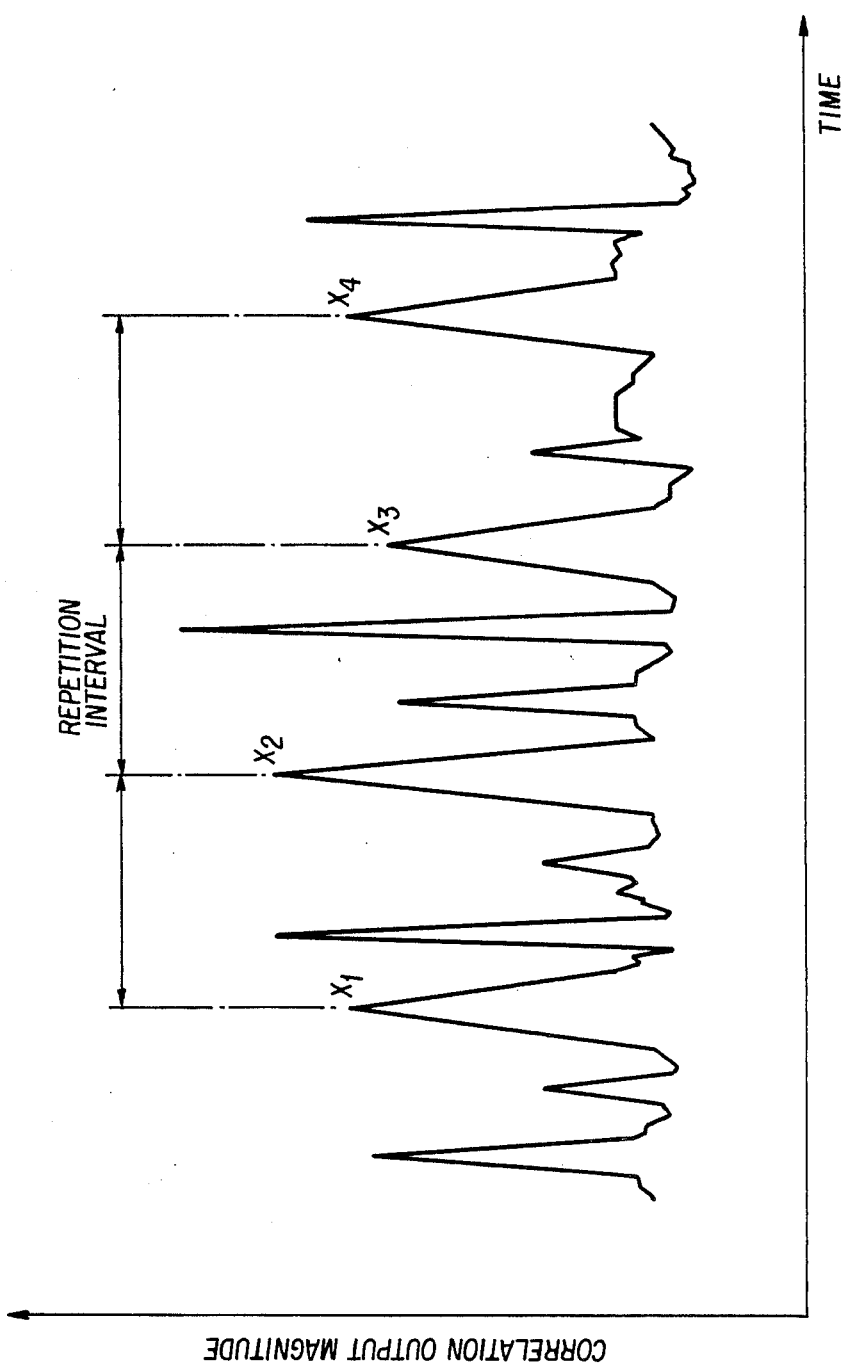
FIG. 8 illustrates the magnitude of the correlation output of the SAW filter of FIG. 5 as a function of time as it might appear during reception of a burst transmission.

FIG. 8 is a graph illustrating the magnitude of the correlation output of the matched SAW filter 40 in FIG. 5 as a function of time when a burst transmission is received. X1, X2, X3, and X4 denote the correlation peaks which occur when each repetition of the acquisition sequence is detected. The remaining peaks represent noise. The function of the storage and calculation circuit 50 in FIG. 5 is to calculate both the mean value and the variance of the correlation peaks. The mean value is the sum of the samples (i.e., peak magnitudes) divided by the number of samples. The variance may be calculated in accordance with the equation:

$$\sigma^2 = \left[ n \sum_{i=1}^{n} (x_i)^2 - \left( \sum_{i=1}^{n} x_i \right)^2 \right] / [n(n-1)]$$

where $\sigma^2$ is the variance, $x_i$ is the magnitude of the ith correlation peak, and n is the number of samples (i.e., the number of repetitions of the acquisition sequence in the burst). For the purposes of the present invention, the term "variance" is intended to refer not only to the mathematically defined variance ($\sigma^2$), but also to other measurements which characterize or quantify the relative variation among a group of samples, such as the standard deviation ($\sigma$).

The storage and calculation circuit 50 operates on samples of the SAW filter correlation output at a rate which is high relative to the acquisition sequence repetition rate because a transmission may arrive at any time, and the time of arrival of the sequence must be quickly determined for position calculation purposes. Also, the signal must be switched to a demodulation chain before the arrival of the data portion of the burst. However, correlation peaks have a duration of less than one chip period, even though the acquisition sequence may be thousands of chips long. This is so because the individual energy peaks which make up the acquisition sequence propagate across the SAW filter as surface waves. The unique pattern becomes aligned with the detecting strips for less than one chip period before their propagation carries them out of alignment. Thus, in order to detect the correlation pulses, the storage and calculation circuit 50 must perform the calculation at least once per chip period. In the preferred embodiment, the storage and calculation circuit 50 performs the calculation twice per chip period. For example, if the chip rate is 8 million per second, the calculation rate would be 16 million per second.

It should be emphasized that the storage and calculation circuit 50 must operate on correlation peaks which are separated in time by the repetition period of the acquisition sequence. That is to say, for an acquisition sequence made up of four repetitions of a 1024-chip code, the four correlation peaks from the burst from one user are separated by 1024-chip intervals. After four repetitions of the acquisition code, a total of 4096 chips have been received, and 8192 values have been stored because the storage and calculation circuit 50 operates at twice the chip rate. For each calculation, the storage and calculation circuit 50 selects the four most recent values whose times of arrival are separated by the appropriate 1024-chip interval and calculates the mean value and variance of those four values. At the time of the next calculation, the storage and calculation circuit discards the oldest value, acquires a new value, and performs the calculation on a new set of four values. In this manner, the acquisition circuit 34 can detect the presence of a signal within one-half of a chip period from the time of arrival of the last chip of the fourth repetition of the acquisition sequence.

Figure 9:
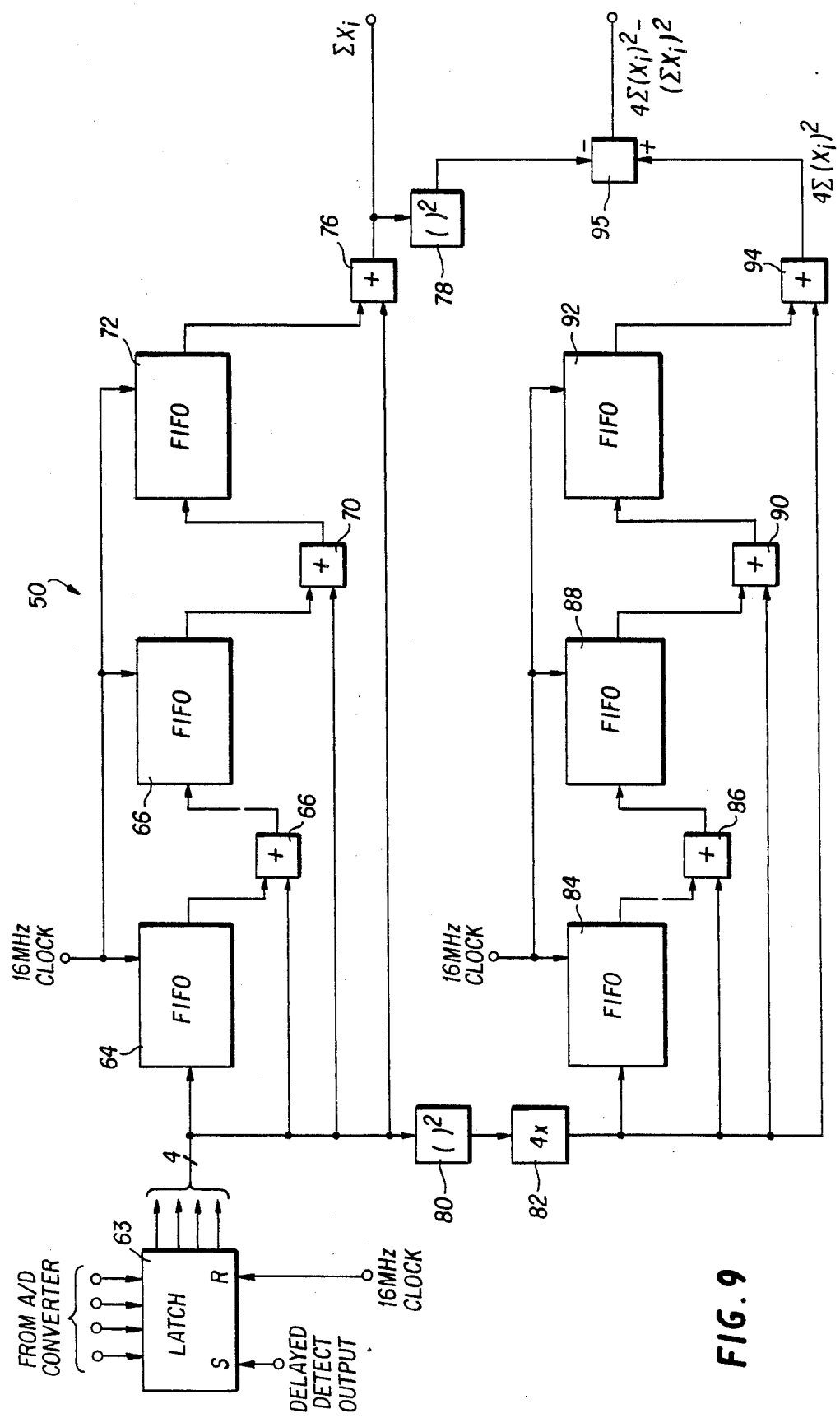
FIG. 9 depicts circuitry for computing digital values proportional to the mean value and variance of the peak values of the SAW filter correlation output.

FIG. 9 illustrates a preferred embodiment of the storage and calculation circuit 50. The operation of the mean value portion of the circuit is best described by way of example. A particular sample or correlation peak X1 which corresponds to the arrival of the first repetition of the acquisition sequence is digitized by the A/D converter 48 of FIG. 5 as described previously, and the digitized value is applied to the inputs of a latch 63. The latch is set by the detect output from the gated comparator 62 of FIG. 6, delayed by the delay line 47 of FIG. 5, and is periodically reset (i.e., cleared) by a 16 MHz clock signal. The data stored in the latch 63 is clocked into a first-in-first-out (FIFO) register 64, also at the 16 MHz clock rate. The length of the FIFO register is chosen so that the sample is delayed until the time when the second repetition should be detected. An adder 66 adds the second sample X2 to the first sample X1, and a second FIFO register 68 delays the sum of the first two samples until the time when the third repetition should be detected. An adder 70 adds the third sample X3 to the sum of the first two, and a third FIFO register 72 delays the sum of the first three samples until the time when the fourth repetition should be detected. An adder 76 adds the fourth sample X4 to the sum of the first three, and the result is a value proportional to the mean value of the four samples. The sum of the four samples differs from the mean only in that the sum has not been divided by the number of samples (i.e., four in this example). For the purpose of the decision unit (hereinafter discussed), the scalar factor is unimportant, and circuitry need not be included to perform the division.

To compute the variance, it is necessary to compute a term for the sum of the squares of the samples and a term for the square of the sum of the samples. To compute the square of the sum, a multiplier 78 squares the signal from the output of adder 76 which, as described above, represents the sum of the samples. The sum of the squares is computed using FIFO registers and adders in the same manner as for computing the sum of the samples. A multiplier 80 squares the individual values, and another multiplier 82 multiplies the squared values by a scalar. The length of the first FIFO register 84 is chosen so that the squared and scaled value of the first sample X1 is delayed until the time when the second repetition sequence X2 should be detected. An adder 86 adds the second squared and scaled value to the first, and a second FIFO register 88 delays the sum of the first two squared and scaled samples until the time when the third repetition X3 should be detected. An adder 90 adds the third squared and scaled sample to the sum of the first two, and a third FIFO register 92 delays the sum of the first three squared and scaled samples until the time when the fourth repetition X4 should be detected. An adder 94 adds the fourth squared and scaled sample to the sum of the first three, and the result is the sum of the squares of the samples multiplied by a constant.

The output of adder 94, which is a value proportional to the sum of the squares, is subtracted by means of a subtracter 95 from the output of multiplier 78, which is the square of the sum, to produce a value proportional to the variance of the samples. This value differs from the variance only in that the sum has not been divided by the factor $n(n-1)$. For the purpose of the decision unit (hereinafter discussed), the scalar factor is unimportant, and circuitry need not be included to perform the division.

The FIFO registers store binary values whose magnitudes increase as successive arithmetic operations are performed. For example, the sum of two four-bit binary numbers produces a value which may be a five-bit binary number. The FIFO registers must be selected to accommodate the increasing magnitude of the values they are required to store, as well as to provide the appropriate delay. As noted previously, the required delay is equal to the known interval between successive occurrences of the acquisition code. This delay, together with the known clocking rate of the acquisition circuit, will dictate the required length of the FIFO registers.

Figure 10:
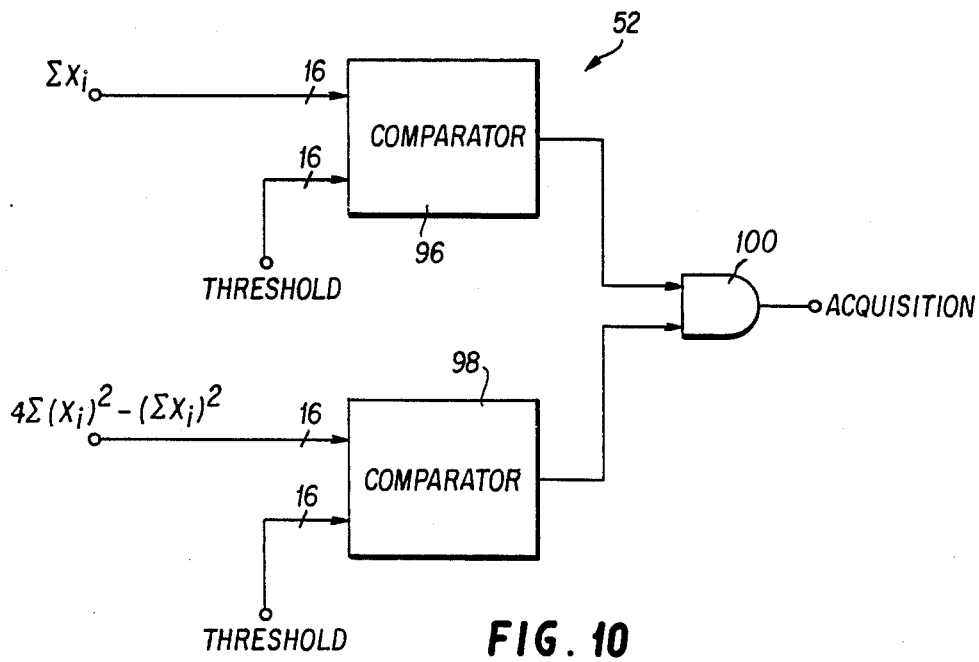
FIG. 10 depicts circuitry for comparing the computed mean value and variance of the peak values of the SAW filter correlation output to threshold values and for declaring acquisition of a transmission.

FIG. 10 illustrates a preferred embodiment of the decision circuit 52. Comparators 96, 98 compare the mean value and the variance computed by the storage and calculation circuit 50 to predetermined threshold values, and produce output signals when the mean is above its threshold and when the variance is below its threshold, respectively. An AND gate 100 produces an output indicating signal acquisition when both of these conditions are present. Because the storage and calculation circuit 50 generates values which are proportional but not identical to the mathematical mean and variance, the threshold values are scaled to levels commensurate with the values produced by the storage and calculation circuit. Threshold values may be set by switches or by a computer interface, or by other methods.

Figure 11:
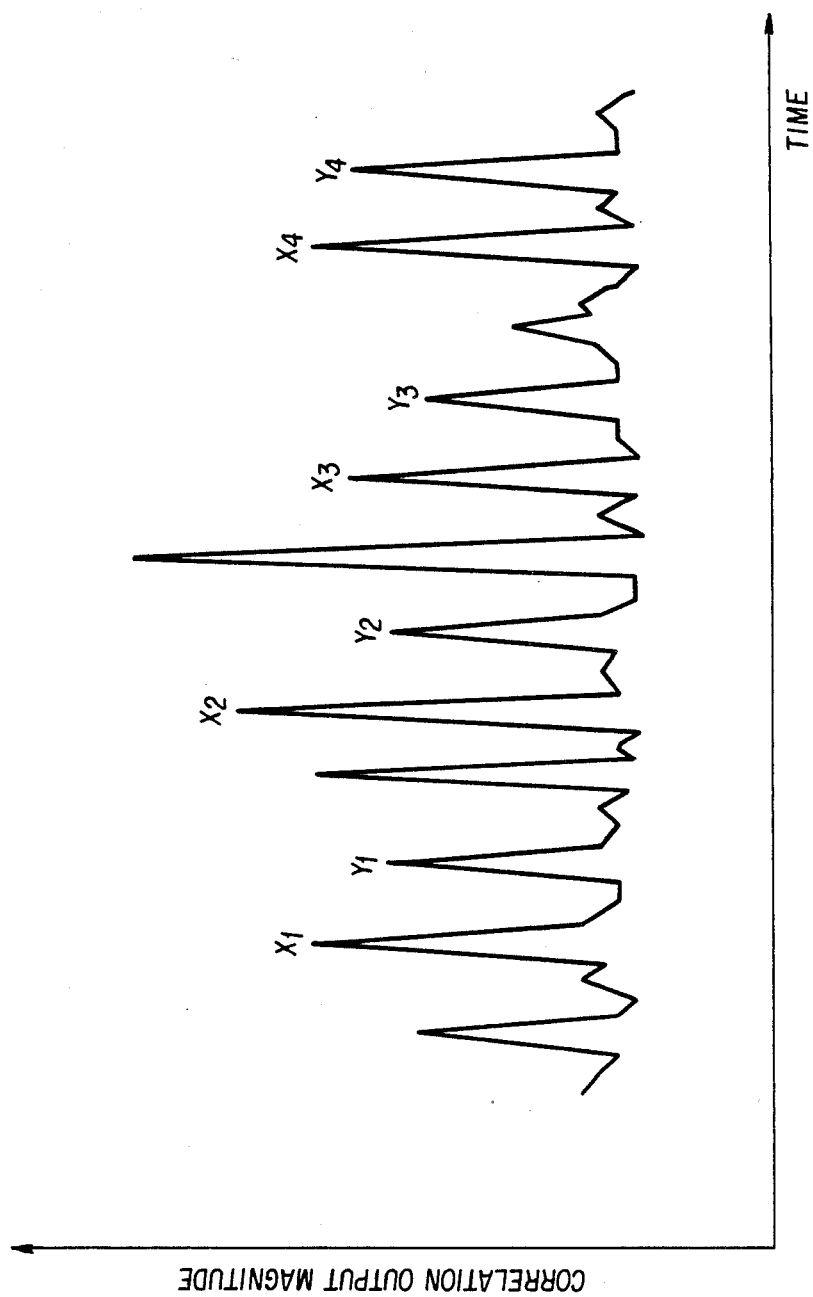
FIG. 11 illustrates the magnitude of the correlation output of the SAW filter of FIG. 5 as a function of time as it might appear during reception of two burst transmissions which overlap in time.

FIG. 11 is a graph illustrating the magnitude of the correlation output of the SAW matched filter 40 in FIG. 5 as a function of time as it might appear when two burst transmissions X, Y are received in an overlapping manner. This would be expected to occur in a multiuser communication network of the type illustrated in FIG. 1. The storage and calculation circuit 50 will calculate the mean value and variance of the peaks of the first burst (X1, X2, X3, X4) at a time when the peaks of the second burst (Y1, Y2, Y3, Y4) are still propagating through the FIFO registers 64, 68, 72 and 84, 86, 92. The storage and calculation circuit 50 will compute the mean value and variance for the second burst when the final repetition of its acquisition sequence is detected. It will be apparent that the acquisition circuit 34 is capable of detecting the presence of multiple burst transmissions which overlap in time, as long as the bursts are separated by at least one chip period.

The operation of the invention can now be summarized with reference to FIG. 5. When a single burst transmission arrives at the receiver, the modulated carrier is input to both the acquisition circuit 34 and a control and switching circuit 36. In the acquisition circuit 34, the signal first passes to a matched SAW filter 40 which detects the presence of one repetition of the acquisition seuuence. An analog-to-digital converter 48 samples the peak of the envelope of the correlation output of the matched SAW filter 40. Storage and calculation circuitry 50 computes the mean and variance for samples taken at time intervals which correspond to the anticipated time intervals between arrivals of repetitions of the acquisition sequence. A decision circuit 52 produces an acquisition signal when the mean value is greater than a first threshold value and the variance is less than a second threshold value. The acquisition signal causes the control and switching circuit 36 to route the incoming signal to one of the demodulation chains 38.

When multiple bursts arrive and the acquisition sequences overlap, all bursts can be detected as long as each burst is shifted relative to the others by at least one chip time. When the incoming signal (which is the sum of two or more transmissions) passes through the matched SAW filter 40, the correlation output will be small except at the times when any of the acquisition sequences has propagated across the SAW filter crystal. At the time when the first acquisition sequence is fully propagated (and the second is only partially propagated), the correlation output magnitude will be large, and the peak detector 44 will cause the A/D converter 48 to measure its peak. At the time when the second acquisition sequence is fully propagated, the correlation output will again be large and the peak detector 44 will again trigger the A/D converter 48 to measure its peak. Each time an acquisition sequence propagates across the SAW filter, the peak detector 44 will trigger digitization of the magnitude of the correlation output by the A/D converter 48. The intermingled sets of samples will shift through the FIFO registers 64, 68, 72 and 84, 88, 92. The storage and calculation circuit 50 will calculate separate mean and variance values for each burst transmission, and the decision circuit 52 will produce separate signals to the control and switching circuit 36. The control and switching circuit 36 will, in turn, route the incoming signals to different demodulation chains 38. Because the detection occurs at different times, the demodulation chain for the first burst to arrive will be synchronized to the first burst, while the demodulation chains for subsequent bursts will be synchronized to the subsequent bursts.

Although the present invention has been described with reference to a preferred embodiment, the invention is not limited to the details thereof. For example, although discussed here in the context of a radio position determination and message exchange system employing satellite relays, the present invention is also applicable to other communication systems which require a receiver to detect the presence of, and to synchronize to, non-continuous or burst transmissions. Other substitutions and modifications will occur to those of ordinary skill in the art, and all such substitutions and modifications are intended to fall within the scope of the invention as defined in the appended claims.

What is claimed is:

1. A method for detecting a burst signal transmission containing a sequence of N acquisition codes occurring at known time intervals, comprising:
   receiving said burst signal transmission and comparing successively received portions thereof to a stored acquisition code pattern;
   generating a time-varying correlation output having a magnitude proportional to the similarity between the successively received portions of the burst signal transmission and the stored acquisition code pattern;
   detecting and measuring peaks in the magnitude of said correlation output;
   forming a group of N peak magnitudes occurring at time intervals corresponding to said known time intervals;
   computing values proportional to the mean value and variance, respectively, of the group of N peak magnitudes;
   comparing the computed values proportional to the mean value and variance to predetermined minimum and maximum values, respectively; and
   indicating the presence of a burst signal transmission when the computed value proportional to the mean value exceeds said minimum value and the computed value proportional to the variance is less than said maximum value.

2. The method of claim 1, wherein said acquisition codes are identical to each other.

3. The method of claim 1, wherein said known time intervals are equal to each other.

4. The method of claim 1, wherein said burst signal transmission comprises a digital bit stream modulated on a carrier frequency, and wherein the step of comparing successively received portions of the burst signal transmission to a stored acquisition code pattern is carried out by repeatedly comparing the most recently received bits of the burst signal transmission with stored aacquisition code bits.

5. The method of claim 1, wherein the burst signal transmission comprises a spread spectrum modulated signal.

6. The method of claim 5, wherein the burst signal transmission is modulated by a direct sequence pseudo-noise code.

7. The method of claim 1, wherein said burst signal transmission contains data following said sequence of N acquisition codes, and further comprising the step of demodulating said data following an indication that a burst signal transmission is present.

8. A method for detecting first and second burst signal transmissions arriving in an overlapping manner, each transmission containing a sequence of N acquisition codes occurring at known time intervals, comprising:
   receiving each of said first and second burst signal transmissions and comparing successively received portions of each burst signal transmission to a stored acquisition code pattern;
   generating a time-varying correlation output having a magnitude proportional to the similarity between the successively received portions of each burst signal transmission and the stored acquisition code pattern;
   detecting and measuring peaks in the magnitude of said correlation output;
   forming first and second groups of N peak magnitudes, the peak magnitudes of each group occurring at time intervals corresponding to said known time intervals;
   computing values proportional to the mean value and variance, respectively, of each such group of N peak magnitudes;
   comparing the computed values proportional to the mean value and variance of each group to predetermined minimum and maximum values, respectively; and
   indicating the presence of each of said first and second burst signal transmissions when the computed value proportional to the mean value of the corresponding group exceeds said minimum value and the computed value proportional to the variance of said group is less than said maximum value.

9. The method of claim 8, wherein the acquisition codes of each of said first and second transmissions are identical to each other and to the acquisition codes of the other transmission.

10. The method of claim 8, wherein the known time intervals of each of said first and second transmissions are equal to each other and to the known time intervals of the other transmission.

11. The method of claim 8, wherein the predetermined minimum and maximum values are the same for each group of N peak magnitudes.

12. The method of claim 8, wherein said burst transmissions comprise digital bit streams modulated on a carrier frequency, and wherein the step of comparing successively received portions of each burst signal transmission to a stored acquisition code pattern is carried out by repeatedly comparing the most recently received bits of the received signal with stored acquisition code bits.

13. The method of claim 8, wherein the first and second burst signal transmissions comprise spread spectrum modulated signals.

14. The method of claim 13, wherein the first and second burst signal transmissions are modulated by a direct sequence pseudo-noise code.

15. The method of claim 8, wherein each of said first and second burst signal transmissions contains data following said sequence of N acquisition codes, and further comprising the step of demodulating said data following an indication that each of said first and second burst signal transmissions is present.

16. A method for transmitting and receiving burst mode signals, comprising:
  transmitting a burst signal containing a sequence of N acquisition codes occurring at predetermined time intervals;
  receiving said burst signal transmission and comparing successively received portions thereof to a stored acquisition code pattern;
  generating a time-varying correlation output having a magnitude proportional to the similarity between successively received portions of the burst signal transmission and the stored acquisition code pattern;
  detecting and measuring peaks in the magnitude of said correlation output;
  forming a group of N peak magnitudes occurring at time intervals corresponding to said predetermined time intervals;
  computing values proportional to the mean value and variance, respectively, of the group of N peak magnitudes;
  comparing the computed values proportional to the mean value and variance to predetermined minimum and maximum values, respectively; and
  indicating the presence of a burst signal transmission when the computed value proportional to the mean value exceeds said minimum value and the computed value proportional to the variance is less than said maximum value.

17. The method of claim 16, wherein said acquisition codes are identical to each other.

18. The method of claim 16, wherein said known time intervals are equal to each other.

19. The method of claim 16, wherein said burst signal transmission comprises a digital bit stream modulated on a carrier frequency, and wherein the step of comparing successively received portions of the burst signal transmission to a stored acquisition code pattern is carried out by repeatedly comparing the most recently received bits of the burst signal transmission with stored acquisition code bits.

20. The method of claim 16, wherein the burst signal transmission comprises a spread spectrum modulated signal.

21. The method of claim 20, wherein the burst signal transmission is modulated by a direct sequence pseudo-noise code.

22. The method of claim 16, wherein said burst signal transmission contains data following said sequence of N acquisition codes, and further comprising the step of demodulating said data following an indication that a burst signal transmission is present.

23. A method for transmitting first and second burst signals and for receiving said signals in an overlapping manner, comprising:
  transmitting first and second burst signals, each containing a sequence of N acquisition codes occurring at predetermined time intervals;
  receiving each of said first and second burst signal transmissions and comparing successively received portions of each burst signal transmission to a stored acquisition code pattern;
  generating a time-varying correlation output having a magnitude proportional to the similarity between successively received portions of each burst signal transmission and the stored acquisition code pattern;
  detecting and measuring peaks in the magnitude of said correlation output;
  forming first and second groups of N peak magnitudes, the peak magnitudes of each group occurring at time intervals corresponding to said predetermined time intervals;
  computing values proportional to the mean value and variance, respectively, of each such group of N peak magnitudes;
  comparing the computed values proportional to the mean value and variance of each group to predetermined minimum and maximum values, respectively; and
  indicating the presence of each of said first and second burst signal transmissions when the computed value proportional to the mean value of the corresponding group exceeds said minimum value and the computed value proportional to the variance of said group is less than said maximum value.

24. The method of claim 23, wherein the acquisition codes of each of said first and second transmissions are identical to each other and to the acquisition codes of the other transmission.

25. The method of claim 23, wherein the predetermined time intervals of each of said first and second transmissions are equal to each other and to the predetermined time intervals of the other transmission.

26. The method of claim 23, wherein the predetermined minimum and maximum values are the same for each group of N peak magnitudes.

27. The method of claim 23, wherein said burst transmissions comprise digital bit streams modulated on a carrier frequency, and wherein the step of comparing successively received portions of each burst signal transmission to a stored acquisition code pattern is carried out by repeatedly comparing the most recently received bits of the received signal with stored acquisition code bits.

28. The method of claim 23, wherein the first and second burst signal transmissions comprise spread spectrum modulated signals.

29. The method of claim 28, wherein the first and second burst signal transmissions are modulated by a direct sequence pseudo-noise code.

30. The method of claim 23, wherein each of said first and second burst signal transmissions contains data following said sequence of N acquisition codes, and further comprising the step of demodulating said data following an indication that each of said first and second burst signal transmissions is present.

31. An acquisition circuit for detecting a burst signal transmission containing a sequence of N acquisition codes occurring at known time intervals, comprising:
first means for generating a correlation output having a magnitude proportional to the similarity between successively received portions of the burst signal transmission and a stored acquisition code pattern;
second means coupled to said first means for detecting and measuring peaks in the magnitude of said correlation output;
third means coupled to said second means for forming a group of N peak magnitudes occurring at time intervals corresponding to said known time intervals, and for computing values proportional to the mean value and variance, respectively, of said group of N peak magnitudes;
fourth means coupled to said third means for comparing the computed values proportional to the mean value and variance to predetermined minimum and maximum values, respectively, and for indicating the presence of a burst signal transmission when the computed value proportional to the mean value exceeds said minimum value and the computed value proportional to the variance is less than said maximum value.

32. The acquisition circuit of claim 31 wherein said acquisition codes are identical to each other.

33. The acquisition circuit of claim 31, wherein said known time intervals are equal to each other.

34. The acquisition circuit of claim 31, wherein said burst signal transmission comprises a digital bit stream modulated on a carrier frequency, and wherein said first means comprises means for repeatedly comparing the most recently received bits of the received signal with stored acquisition cod bits.

35. The acquisition circuit of claim 31, wherein said first means comprises:
a matched surface acoustic wave filter having an input to which the received signal is applied and an output; and
an envelope detector having an input connected to the output of the surface acoustic wave filter and an output connected to said second means.

36. The acquisition circuit of claim 35, wherein said second means comprises:
a peak detector having an input coupled to the output of said envelope detector and an output; and
an analog-to-digital converter having an analog signal input coupled to the output of said envelope detector, an enable input coupled to the output of the peak detector, and a digital output coupled to the input of said third means.

37. The acquisition circuit of claim 36, wherein said third means comprises a storage and calculation circuit having a digital input coupled to the digital output of the analog-to-digital converter, an enable input coupled to the output of the peak detector, and first and second digital outputs for providing the computed values proportional to the mean value and variance, respectively, to said fourth means.

38. The acquisition circuit of claim 37, wherein said storage and calculation circuit comprises first and second circuit paths, each of said circuit paths having an input coupled to the digital input of the storage and calculation circuit, an output, and a series of N−1 delay stages between said input and said output, each delay stage comprising:
a clocked first-in-first-out (FIFO) register having an input and an output, said FIFO register having a length sufficient to provide a delay equal to the known interval between successive acquisition codes; and
an adder having a first input coupled to the output of the FIFO register, a second input coupled to the digital input of the storage and calculation circuit, and an output;
said delay stages being connected in a manner such that the FIFO register of the first delay stage has its input coupled to the digital input of the storage and calculation circuit, and the FIFO register of each succeeding delay stage has its input coupled to the output of the adder in the immediately preceding delay stage, the output of the adder in the last delay stage providing the output of the corresponding circuit path.

39. The acquisition circuit of claim 38, further comprising:
a first squaring circuit and a multiply-by-N scalar circuit connected in series and interposed between the input of the second circuit path and the inputs of the FIFO register and adder of the first delay stage in the second circuit path;
a second squaring circuit having an input coupled to the output of the first circuit path and an output; and
a subtracter having a first input coupled to the output of the second circuit path, a second input coupled to the output of the second squaring circuit, and an output;
wherein the output of the first circuit path provides the first digital output of the storage and calculation circuit and the output of the subtracter provides the second digital otuput of the storage and calculation circuit.

40. The acquisition circuit of claim 39, further comprising a latch circuit having a digital input coupled to the digital input of the storage and calculation circuit, a digital output coupled to the inputs of the first and second circuit paths, a set input coupled to the enable input of the storage and calculation circuit, and a reset input coupled to a clock signal source.

41. The acquisition circuit of claim 37, wherein said fourth means comprises:
a first comparator having a first input coupled to the first digital output of the storage and calculation circuit, a second input, and an output;
means for applying said predetermined minimum mean value to the second input of said first comparator;
a second comparator having a first input coupled to the second digital output of the storage and calculation circuit, a second input, and an output;
means for applying said predetermined maximum variance value to the second input of said second comparator; and
an AND circuit having first and second inputs coupled to the outputs of the first and second comparators, respectively, and an output, the output of said AND circuit indicating the absence or presence of a burst signal transmission.

42. A receiver for receiving a burst signal transmission containing a sequence of N acquisition codes occurring at known time intervals and followed by data, said receiver comprising an acquisition circuit and a signal processing circuit, said acquisition circuit comprising:

first means for generating a correlation output having a magnitude proportional to the similarity between successively received portions of the burst signal transmission and a stored acquisition code pattern;

second means coupled to said first means for detecting and measuring peaks in the magnitude of said correlation output;

third means coupled to said second means for forming a group of N peak magnitudes occurring at time intervals corresponding to said known time intervals, and for computing values proportional to the mean value and variance, respectively, of said group of N peak magnitudes; and fourth means coupled to said third means for comparing the computed values proportional to the mean value and variance to predetermined minimum and maximum values, respectively, and for indicating the presence of a burst signal transmission when the computed value proportional to the mean value exceeds said minimum value and the computed value proportional to the variance is less than said maximum value.

43. The receiver of claim 42 wherein said acquisition codes are identical to each other.

44. The receiver of claim 42, wherein said known time intervals are equal to each other.

45. The receiver of claim 42, wherein said burst signal transmission comprises a digital bit stream modulated on a carrier frequency, and wherein said first means comprises means for repeatedly comparing the most recently received bits of the received signal with stored acquisition code bits.

46. The receiver of claim 42, wherein said first means comprises:

a matched surface acoustic wave filter having an input to which the received signal is applied and an output; and an envelope detector having an input connected to the output of the surface acoustic wave filter and an output connected to said second means.

47. The receiver of claim 46, wherein said second means comprises:

a peak detector having an input coupled to the output of said envelope detector and an output; and an analog-to-digital converter having an analog signal input coupled to the output of said envelope detector, an enable input coupled to the output of the peak detector, and a digital output coupled to the input of said third means.

48. The receiver of claim 47, wherein said third means comprises a storage and calculation circuit having a digital input coupled to the digital output of the analog-to-digital converter, an enable input coupled to the output of the peak detector, and first and second digital outputs for providing the computed values proportional to the mean value and variance, respectively, to said fourth means.

49. The receiver of claim 48, wherein said storage and calculation circuit comprises first and second circuit paths, each of said circuit paths having an input coupled to the digital input of the storage and calculation circuit, an output, and a series of N−1 delay stages between said input and said output, each delay stage comprising:

a clocked first-in-first-out (FIFO) register having an input and an output, said FIFO register having a length sufficient to provide a delay equal to the known interval between successive acquisition codes; and an adder having a first input coupled to the output of the FIFO register, a second input coupled to the digital input of the storage and calculation circuit, and an output;

said delay stages being connected in a manner such that the FIFO register of the first delay stage has its input coupled to the digital input of the storage and calculation circuit, and the FIFO register of each succeeding delay stage has its input coupled to the output of the adder in the immediately preceding delay stage, the output of the adder in the last delay stage providing the output of the corresponding circuit path.

50. The receiver of claim 49, further comprising:

a first squaring circuit and a multiply-by-N scalar circuit connected in series and interposed between the input of the second circuit path and the inputs of the FIFO register and adder of the first delay stage in the second circuit path;

a second squaring circuit having an input coupled to the output of the first circuit path and an output; and a subtracter having a first input coupled to the output of the second circuit path, a second input coupled to the output of the second squaring circuit, and an output;

wherein the output of the first circuit path provides the first digital output of the storage and calculation circuit and the output of the subtracter provides the second digital otuput of the storage and calculation circuit.

51. The receiver of claim 50, further comprising a latch circuit having a digital input coupled to the digital input of the storage and calculation circuit, a digital output coupled to the inputs of the first and second circuit paths, a set input coupled to the enable input of the storage and calculation circuit, and a reset input coupled to a clock signal source.

52. The receiver of claim 48, wherein said fourth means comprises:

a first comparator having a first input coupled to the first digital output of the storage and calculation circuit, a second input, and an output;

means for applying said predetermined minimum mean value to the second input of said first comparator;

a second comparator having a first input coupled to the second digital output of the storage and calculation circuit, a second input, and an output;

means for applying said predetermined maximum variance value to the second input of said second comparator; and an AND circuit having first and second inputs coupled to the outputs of the first and second comparators, respectively, and an output, the output of said AND circuit indicating the absence or presence of a burst signal transmission.

53. The receiver of claim 42, wherein said signal processing circuit comprises:

a control and switching circuit having a signal input to which the received signal is applied, an enable input coupled to said fourth means, and a plurality of signal outputs; and a plurality of demodulation circuits, each coupled to a corresponding signal output of said control and switching circuit, for simultaneously demodulating the data contained in a plurality of received signals.

54. A communication system comprising:

a transmitter for transmitting a burst signal transmission containing a sequence of N acquisition codes occurring at predetermined time intervals and followed by data;

a receiver for receiving and detecting said burst signal transmission, said receiver comprising an acquisition circuit and a signal processing circuit, said acquisition circuit comprising:

first means for generating a correlation output having a magnitude proportional to the similarity between successively received portions of the burst signal transmission and a stored acquisition code pattern;

second means coupled to said first means for detecting and measuring peaks in the magnitude of said correlation output;

third means coupled to said second means for forming a group of N peak magnitudes occurring at time intervals corresponding to said predetermined time intervals, and for computing values proportional to the mean value and variance, respectively, of said group of N peak magnitudes; and fourth means coupled to said third means for comparing the computed values proportional to the mean value and variance to predetermined minimum and maximum values, respectively, and for indicating the presence of a burst signal transmission when the computed value proportional to the mean value exceeds said minimum value and the computed value proportional to the variance is less than said maximum value.

55. The communication system of claim 54, wherein said acquisition codes are identical to each other.

56. The communication system of claim 54, wherein said predetermined time intervals are equal to each other.

57. The communication system of claim 54, wherein said burst signal transmission comprises a digital bit stream modulated on a carrier frequency, and wherein said first means comprises means for repeatedly comparing the most recently received bits of the received signal with stored acquisition code bits.

58. The communication system of claim 54, wherein said first means comprises:

a matched surface acoustic wave filter having an input to which the received signal is applied and an output; and an envelope detector having an input connected to the output of the surface acoustic wave filter and an output connected to said second means.

59. The communication system of claim 58, wherein said second means comprises:

a peak detector having an input coupled to the output of said envelope detector and an output; and an analog-to-digital converter having an analog signal input coupled to the output of said envelope detector, an enable input coupled to the output of the peak detector, and a digital output coupled to the input of said third means.

60. The communication system of claim 59, wherein said third means comprises a storage and calculation circuit having a digital input coupled to the digital output of the analog-to-digital converter, an enable input coupled to the output of the peak detector, and first and second digital outputs for providing the computed values proportional to the mean value and variance, respectively, to said fourth means.

61. The communication system of claim 60, wherein said storage and calculation circuit comprises first and second circuit paths, each of said circuit paths having an input coupled to the digital input of the storage and calculation circuit, an output, and a series of N−1 delay stages between said input and said output, each delay stage comprising:

a clocked first-in-first-out (FIFO) register having an input and an output, said FIFO register having a length sufficient to provide a delay equal to the predetermined interval between successive acquisition codes; and an adder having a first input coupled to the output of the FIFO register, a second input coupled to the digital input of the storage and calculation circuit, and an output;

said delay stages being connected in a manner such that the FIFO register of the first delay stage has its input coupled to the digital input of the storage and calculation circuit, and the FIFO register of each succeeding delay stage has its input coupled to the output of the adder in the immediately preceding delay stage, the output of the adder in the last delay stage providing the output of the corresponding circuit path.

62. The communication system of claim 61, further comprising:

a first squaring circuit and a multiply-by-N scalar circuit connected in series and interposed between the input of the second circuit path and the inputs of the FIFO register and adder of the first delay stage in the second circuit path;

a second squaring circuit having an input coupled to the output of the first circuit path and an output; and a subtracter having a first input coupled to the output of the second circuit path, a second input coupled to the output of the second squaring circuit, and an output;

wherein the output of the first circuit path provides the first digital output of the storage and calculation circuit and the output of the subtracter provides the second digital otuput of the storage and calculation circuit.

63. The communication system of claim 62, further comprising a latch circuit having a digital input coupled to the digital input of the storage and calculation circuit, a digital output coupled to the inputs of the first and second circuit paths, a set input coupled to the enable input of the storage and calculation circuit, and a reset input coupled to a clock signal source.

64. The communication system of claim 60, wherein said fourth means comprises:

a first comparator having a first input coupled to the first digital output of the storage and calculation circuit, a second input, and an output;

means for applying said predetermined minimum mean value to the second input of said first comparator;

a second comparator having a first input coupled to the second digital output of the storage and calculation circuit, a second input, and an output;

means for applying said predetermined maximum variance value to the second input of said second comparator; and an AND circuit having first and second inputs coupled to the outputs of the first and second comparators, respectively, and an output, the output of said AND circuit indicating the absence or presence of a burst signal transmission.

65. The communication system of claim 54, wherein said signal processing circuit comprises:

a control and switching circuit having a signal input to which the received signal is applied, an enable input coupled to said fourth means, and a plurality of signal outputs; and a plurality of demodulation circuits, each coupled to a corresponding signal output of said control and switching circuit, for simultaneously demodulating the data contained in a plurality of received signals.

66. The communication system of claim 54, wherein said transmitter comprises a remote mobile transmitter.

67. The communication system of claim 54, wherein a plurality of said transmitters are provided.

68. The communication system of claim 54, wherein said burst signal transmission is relayed from the transmitter to the receiver through at least one relay satellite.

* * * * *